(12) United States Patent
Nakazato et al.

(10) Patent No.: US 8,013,064 B2
(45) Date of Patent: Sep. 6, 2011

(54) PERFLUOROELASTOMER COMPOSITION AND SEALING MATERIAL

(75) Inventors: Katsuhiko Nakazato, Sagamihara (JP); Tatsuo Fukushi, Woodbury, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 0 days.

(21) Appl. No.: 12/532,466

(22) PCT Filed: Apr. 11, 2008

(86) PCT No.: PCT/US2008/060018
§ 371 (c)(1),
(2), (4) Date: Sep. 22, 2009

(87) PCT Pub. No.: WO2007/111465
PCT Pub. Date: Oct. 4, 2007

(65) Prior Publication Data
US 2010/0105819 A1    Apr. 29, 2010

(30) Foreign Application Priority Data

Apr. 16, 2007 (JP) ................................. 2007-107167

(51) Int. Cl.
*C08L 27/12* (2006.01)
(52) U.S. Cl. ........................................ 525/104; 525/187
(58) Field of Classification Search ........................ None
See application file for complete search history.

(56) References Cited

U.S. PATENT DOCUMENTS

| | | | |
|---|---|---|---|
| 6,265,494 B1 * | 7/2001 | Wlassics et al. | 525/326.3 |
| 2002/0035220 A1 | 3/2002 | Bowers et al. | |
| 2004/0126708 A1 * | 7/2004 | Jing et al. | 430/320 |
| 2006/0293432 A1 | 12/2006 | Hirano et al. | |

FOREIGN PATENT DOCUMENTS

| | | |
|---|---|---|
| JP | 2000-290454 | 10/2000 |
| JP | 2006-036884 | 2/2006 |
| JP | 2006-117878 | 11/2006 |
| KR | 10-2007-0005865 | 1/2007 |
| WO | WO 2007/111465 A1 * | 10/2007 |

* cited by examiner

*Primary Examiner* — Marc Zimmer
(74) *Attorney, Agent, or Firm* — Julie A. Lapos-Kuchar

(57) ABSTRACT

To provide an elastomer composition that can be easily prevented from being blocking to a substrate. A perfluoroelastomer composition comprising (A) a perfluoroelastomer and (B) a fluorosilane compound.

7 Claims, No Drawings

PERFLUOROELASTOMER COMPOSITION AND SEALING MATERIAL

CROSS REFERENCE TO RELATED APPLICATIONS

This application is a national stage filing under 35 U.S.C. 371 of PCT/US2008/060018, filed Apr. 11, 2008, which claims priority to Japanese Application No. 2007-107167, filed Apr. 16, 2007, the disclosure of which is incorporated by reference in its/their entirety herein.

TECHNICAL FIELD

The present invention relates to a perfluoroelastomer composition and a sealing material using the same.

BACKGROUND

Perfluoroelastomers may be used as a sealing material for semiconductor equipment (such as a dry etching apparatus or a chemical vapor deposition (CVD) apparatus) because of its excellent plasma resistance, chemical resistance, and heat resistance. In recent years, extreme production conditions such as heating the semiconductor equipment to 200° C. or higher have been used. Consequently, the perfluoroelastomer seal may stick to the equipment substrate (for example, metal).

Typically, conventional methods comprising modification of the perfluoroelastomer surface are used to create a tack free surface and prevent firm fixation. For example, a surface treatment agent may be dissolved in a solvent capable of swelling an elastomer or rubber. A rubber is then immersed in the solution, thereby impregnating the swollen rubber with the surface treatment agent. Such a method has been disclosed in J.P. Application No. 2006-117878. However, after a molding process (post cure), a treatment step becomes required. In another example, a surface treatment agent having an analogous structure to an elastomer is coated onto the surface of the elastomer. Such a method has been disclosed in J.P Application No. 2006-36884. The surface treatment agent may comprise a compound having a perfluoropolyether having a self-crosslinking functional group. The perfluoroelastomer is coated with the surface treatment agent and heated, thereby; the compound having a perfluoropolyether is polymerized. However, in both of the examples described above, additional processing steps are necessary. In the case of the first example, a treatment step is required and in the second example, a coating and a heating step are required.

DISCLOSURE OF THE INVENTION SUMMARY

It is desirable to obtain a tack free perfluoroelastomer that does not have firm fixation to a substrate wherein the general properties of the substrate for the perfluoroelastomer are not changed and wherein special steps are not required. It is also desirable to develop a convenient, cost effective method of manufacture for tack free perfluoroelastomers.

The present invention includes the following:
(1) A perfluoroelastomer composition comprising (A) a perfluoroelastomer and (B) a fluorosilane compound.
(2) The perfluoroelastomer composition described in (1), wherein the fluorosilane compound is a perfluoropolyether.
(3) The perfluoroelastomer composition described in (1) or (2), wherein the fluorosilane compound is a fluorodisilane compound.
(4) The perfluoroelastomer composition described in any one of (1) to (3), wherein the fluorosilane compound is contained in an amount of 0.2 to 1 parts by mass based on 100 parts by mass of the perfluoroelastomer.
(5) A sealing material shaped from the perfluoroelastomer described in (1), (2), (3) or (4).

DETAILED DESCRIPTION

The perfluoroelastomer composition according to the present invention contains a small amount of a fluorosilane compound and thereby, the firm fixation of the fluoroelastomer to a substrate (for example, metal) can be prevented. For purposes of this disclosure, a small amount means an amount sufficient to make the polymer tack free, but not compromise the elastomeric properties of the fluoroelastomer.

The perfluoroelastomer compositions according to the present invention do not require an additional step(s) to generate a tack free fluoroelastomer. Because a small amount of fluorosilane is used, a tack free perfluoroelastomer composition is obtained while the elastomeric properties of the perfluoroelastomer composition are not degraded.

For purposes of this disclosure, a perfluoroelastomer is considered a material essentially made from perfluorinated monomers (that is, greater than 95 mole % is perfluorinated). The polymerized perfluoroelastomer may have end groups that are not perfluorinated because the end groups are dependent on the initiator system or chain transfer agent that is used. In this disclosure, perfluorinated, partially fluorinated and non fluorinated initiator systems and chain transfer agents are considered.

A perfluoroelastomer that can be used for the perfluoroelastomer composition according to the present invention is not particularly limited and is a typical perfluoroelastomer. It is preferable that a main monomer unit composing the perfluoroelastomer is a combination of a perfluoroolefin and a perfluorovinylether.

The perfluoroolefin may include: tetrafluoroethylene, hexafluoropropylene, a mixture thereof, and so forth, and particularly tetrafluoroethylene is preferable.

The perfluorovinylether is typically a perfluoro(alkylvinyl)ether or a perfluoro(alkoxyvinyl) ether represented by the following formula (1):

$$CF_2=CFO(R'_fO)_n(R''_fO)_mR_f \quad (1)$$

wherein $R'_f$ and $R''_f$ are the same or different linear or branched perfluoroalkylene groups having 2 to 6 carbon atoms, m and n independently represent an integer of 0 to 10, and $R_f$ is a perfluoroalkyl group having 1 to 6 carbon atoms.

The preferable perfluoro(alkylvinyl)ether includes the compounds of the following formula (2):

$$CF_2=CFO(CF_2CFXO)_nR_f \quad (2)$$

wherein X is F or $CF_3$, n is 0 to 5, and $R_f$ is a perfluoroalkyl group having 1 to 6 carbon atoms.

A preferable perfluoro(alkylvinyl)ether is a compound in which n is 0 or 1 in the formula (2) and $R_f$ contains 1 to 3 carbon atom(s). Examples include: a perfluoro(alkylvinyl) ether such as perfluoro(methylvinyl)ether, perfluoro(ethylvinyl)ether, perfluoro(propylvinyl)ether, and combinations thereof.

Another perfluoro(alkylvinyl)ether monomer that is useful in the present invention includes a compound represented by the following formula (3):

$$CF_2=CFO[(CF_2)_mCF_2CFZO]_nR_f \quad (3)$$

wherein $R_f$ is a perfluoroalkyl group having 1 to 6 carbon atoms, m is 0 or 1, n is 0 to 5, and Z is F or $CF_3$. A preferable perfluoro(alkylvinyl) ether monomer is a compound in which $R_f$ is $C_3F_7$, m is 0, and n is 1.

Another perfluoro(alkylvinyl)ether monomer that is useful in the present invention includes a compound represented by the following formula (4):

$$CF_2=CFO[(CF_2CFCF_3O)_n(CF_2CF_2CF_2O)_m(CF_2)_p]C_xF_{2x+1} \quad (4)$$

wherein m and n each represent an integer of 0 or 1 to 10, p is 0 to 3, and x is 0 to 5.

The perfluoro(alkoxyvinyl)ether that is useful in the present invention includes a compound represented by the following formula (5):

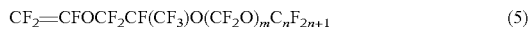

$$CF_2=CFOCF_2CF(CF_3)O(CF_2O)_mC_nF_{2n+1} \quad (5)$$

wherein n is 1 to 5, and preferably 1, and m is 1 to 3.

Perfluoro(alkoxyvinyl)ether that is useful in the present invention include, for example, $CF_2=CFOCF_2OCF_2CF_2CF_3$, $CF_2=CFOCF_2OCF_3$, $CF_2=CFO(CF_2)_3OFC_3$, $CF_2=CFOCF_2CF_2OCF_3$, and combinations thereof.

It is also possible that a mixture of the perfluoro(alkylvinyl)ether and the perfluoro(alkoxyvinyl)ether is used.

A cure site monomer is introduced in the perfluoroelastomer and a crosslinked structure is formed to achieve the elastomeric properties. The cure site monomer may participate in peroxide cure reactions. Generally, the most preferable cure site monomer contains one or more bromine (Br) group(s) or iodine (I) group(s). The cure site monomer may contain another functional group such as a nitrile (CN) group.

A preferable cure site monomer containing a Br or I group includes: bromodifluoroethylene, bromotrifluoroethylene iodotrifluoroethylene, 4-bromo-3,3,4,4-tetrafluorobutene-1, $CF_2=CFOCF_2CF_2Br$, $CF_2=CFOCF_2CF_2CF_2Br$, $CF_2=CFOCF_2CF_2CF_2OCF_2CF_2Br$, and combinations thereof.

A preferable cure site monomer containing CN includes the following compounds:

$$CF_2=CFO(CF_2)_nCN \quad (6)$$

$$CF_2=CFO[CF_2CFCF_3O]_pCF_2CF(CF_3)CN \quad (7)$$

$$CF_2=CF[OCF_2CFCF_3]_xO(CF_2)_mCN \quad (8)$$

wherein n=2 to 12, p=0 to 4, x=1 to 2, and m=1 to 4.

A preferable cure site monomer containing CN includes perfluoro(8-cyano-5-methyl-3,6-dioxa-1-octene).

A particularly useful cure site monomer used in the present invention is bromotrifluoroethylene.

A particularly preferable perfluoroelastomer is a perfluoroelastomer obtained by crosslinking a ternary copolymer composed of approximately 50 to 85 mol% of $CF_2=CF_2$, approximately 15 to 50 mol % of $CF_2=CF(OCF_3)$, and approximately 0.2 to 5.0 mol % of a cure site monomer.

The fluorosilane compound is added in the perfluoroelastomer in a small amount and thereby, firm fixation of the fluoroelastomer to a substrate can be prevented. In one embodiment, the fluorosilane compounds of this disclosure are part of a perfluoropolyether, In one embodiment, the fluorosilane compounds are perfluoropolyethers terminated with a silane.

An extremely small amount of the fluorosilane compound can be added to the elastomer and not degrade the elastomeric properties of the elastomer such as an inherent sealing material (for example, heat resistance/compression set).

The fluorosilane compound preferably is a perfluoropolyether and is, for example, a fluorosilane compound having a perfluoropolyether structure containing the following formula (9):

$$R_f-(Si(OR)_3)_n \quad (9)$$

where $R_f$ is a structure having a perfluoroether group, R is an alkyl group and n is 1 or 2.

In some embodiments, the fluorinated polyether silane may have the structure containing the following formula (10):

$$R_f^1-[-QSiY_{3-x}R^1_x]_y \quad (10)$$

wherein $R_f^1$ represents a monovalent or divalent polyfluoropolyether group, Q represents an organic divalent linking group, $R^1$ represents a C1 to C4 alkyl group, Y represents a hydrolysable group, x is 0 or 1 and y is 1 or 2. Y represents a hydrolysable group such as for example, a halide, a C1-C4 alkoxy group, and acyloxy group or a polyoxyalkylene group. Specific examples of hydrolysable groups include: methoxy, ethoxy, and propoxy groups, chlorine and an acetoxy group.

In some embodiments, the fluorinated polyether silane may have the structure containing the following formula (11):

$$((RO)_3Si-L_r)_m-R_f-(O(CF_2)_s)_n-(OCF_2)_t)_p-(OCF_2CF(CF_3))_q-R_f-L_r-Si(OR)_3 \quad (11)$$

wherein $R_f$ independently is a perfluorinated (C1-C4) alkylene group; m and r independently are 0 or 1; n, p and q independently are integers from 0 to 50; n+p+q>1; s and t independently are 1 to 4; L is a linking organic group —CO—NR'—$(CH_2)_q$— with R'=H or $C_1$-$C_4$ alkylene; and R is an alkyl group. An example includes:
$(CH_3O)_3SiC_3H_6NHCOCF_2(OCF_2CF_2)_m(OCF_2)_n$
$CF_2CONHC_3H_6Si(OCH_3)_3$.

In some embodiments, the fluorinated polyether silane may have the structure containing the following formulas (12) or (13):

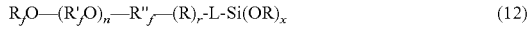

$$R_fO-(R'_fO)_n-R''_f-(R)_r-L-Si(OR)_x \quad (12)$$

or

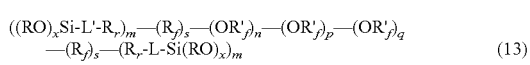

$$((RO)_xSi-L'-R_r)_m-(R_f)_s-(OR'_f)_n-(OR'_f)_p-(OR'_f)_q-(R_f)_s-(R_r-L-Si(RO)_x)_m \quad (13)$$

wherein $R'_f$ independently is at least one of the following structures: $(CFCF_3CF_2)$, $(CF_2CFCF_3)$, $(C_2F_4)$, $(CF_2 CF_3)$, or $(C_4F_9)$, $R_f$ independently is a perfluorinated (C1-C4) alkyl group; $R''_f$ is a perfluorinated (C1-C4) alkylene group; x is 2 or 3, m, s, and r independently are 0 or 1; n, p and q are integers from 0 to 50; n+p+q>1; L is a linking organic group R—S—$C_3H_6$, O—R'—S—$C_3H_6$ or $CO_2$—R'—S—$C_3H_6$; L' is a linking organic group $C_3H_6$—S—R, $C_3H_6$—S—R'—O or $C_3H_6$—S—R'—$CO_2$; R is an alkylene group, and R is an alkyl group. Examples include:
$C_3F_7O[CFCF_3CF_2O]_nCFCF_3CH_2OC_3H_6SC_3H_6Si(OCH_3)_3$, $C_3F_7O[CFCF_3CF_2O]_nCFCF_3CH_2OC_3H_6SC_3H_6Si(OC_2H_5)_2$, $C_3F_7O[CFCF_3CF_2O]_nCFCF_3CO_2C_3H_6SC_3H_6Si(OCH_3)_3$, $C_3F_7O[CFCF_3CF_2O]_nCFCF_3CO_2C_3H_6SC_3H_6Si(OC_2H_5)_3$, $(CH_3O)_3SiC_3H_6SC_3H_6OCH_2CF_2(OC_2F_4)_n(OCF_2)_nCF_2CH_2OC_3H_6SC_3H_6Si(OCH_3)_3$, $(C_2H_5O)_3SiC_3H_6SC_3H_6OCH_2CF_2(OC_2F_4)_n(OCF_2)_nCF_2CH_2OC_3H_6SC_3H_6Si(OC_2H_5)_3$, $(CH_3O)_3SiC_3H_6SC_3H_6OCH_2CFCF_3[OCF_2CF(CF_3)]_nOC_4F_9O[CFCF_3CF_2O]_qCFCF_3CH_2OC_3H_6SC_3H_6Si(OCH_3)_3$, $(C_2H_5O)_3SiC_3H_6SC_3H_6OCH_2CFCF_3[OCF_2CF(CF_3)]_nOC_4F_9O[CFCF_3CF_2O]_qCFCF_3CH_2OC_3H_6SC_3H_6Si(OC_2H_5)_3$, $(CH_3O)_3SiC_3H_6SC_3H_6OCH_2CFCF_3[OCF_2CF_2O]_n$ $CFCF_3CH_2CH_2SC_3H_6Si(OCH_3)_3$, $C_3F_7O[CFCF_3CF_2O]_nCFCF_3CH_2CH_2SC_3H_6Si(OC_2H_5)_3$, $C_3F_7O[CFCF_3CF_2O]_nCFCF_3CF_2OC_3H_6SC_3H_6Si(OCH_3)_3C_3F_7O$ $[CF_2CF_2CF_2O]_nC_2F_4CH_2OC_3H_6SC_3H_6Si(OCH_3)_3$, and
$C_3F_7O[CF_2CF_2CF_2O]_nC_2F_4CH_2CH_2SC_3H_6Si(OCH_3)_3$
wherein n is an integer from 0 to 50 and n+q is up to 30.

It is preferable that the fluorosilane compound is added in an amount of 0.1 to 2 parts by mass based on 100 parts by mass of the perfluoroelastomer, 0.2 to 1 parts by mass based on 100 parts by mass of the perfluoroelastomer, or even 0.5 to 1 parts by mass based on 100 parts by mass of the perfluoroelastomer. If the amount of the fluorosilane compound is too small, then a sufficient tack free effect cannot be realized. If the amount of fluorosilane is too large, the properties of the elastomer may be compromised (for example, sealing and plasma-resistance).

The elastomer composition according to the present invention may contain a filler such as carbon black or silica, a catalytic agent for vulcanization, or the like, as well as the the fluorosilane compound. A special step is not needed to generate a tack free fluoroelastomer because the fluorosilane compound can be added with a filler when compounding the elastomer. Further, the addition of the fluorosilane compound into the perfluoroelastomer can be performed by using existing processing equipment. Therefore, the generation of a tack free fluoroelastomer can be performed more easily and at a lower cost than that of a conventional surface treatment method.

A shaped elastomeric product can be produced by putting the components of the composition in a compounder and then vulcanizing and shaping the components by a conventional method such as a first vulcanization and a post cure.

The shaped elastomeric product obtained from the elastomer composition according to the present invention can be used as a sealing material or the like for a semiconductor equipment (such as a dry etching apparatus or a CVD apparatus). Because a surface of the treated elastomer is made to be non-tacky, the elastomer can be prevented from adhering to a surface with which the elastomer sealing material is in contact, and thereby, the sealing material can be prevented from being damaged by the adherence.

EXAMPLES

Example 1

A sample was obtained by compounding a 100 parts by mass of the perfluoroelastomer (obtained under the tradename "PFE131T", manufactured by Dyneon LLC., Oakdale, Minn.), 7.5 parts by mass of an additive (obtained under the tradename "PFE01C", manufactured by Dyneon LLC.), 15 parts by mass of MT carbon (obtained under the tradename "N990", manufactured by Cancarb, Ltd., Alberta, Canada), 1 part by mass of silica (obtained under the tradename "AEROSIL R-972", manufactured by Japan Aerosil Co., Ltd.), and 0.25 parts by mass of a perfluoropolyether terminated with silane (obtained under the tradename "ECC-1000", manufactured by 3M Company, St. Paul, Minn.). The obtained compound was subjected to a first vulcanization at 188° C. for 15 min. Then, the compound was vulcanized and molded under a post cure condition of 200° C. for 16 hours and 250° C. for 8 hours and thereby, a sheet having a thickness of 2 mm was produced.

Example 2

The same operation as in Example 1 was performed, except that the amount of the ECC-1000 was set to 0.5 parts by mass.

Example 3

The same operation as in Example 1 was performed, except that the amount of the ECC-1000 was set to 0.75 parts by mass.

Example 4

The same operation as in Example 1 was performed, except that the amount of
ECC-1000 was set to 1.0 parts by mass. Moreover, in the same condition as the production of the sheet, an O-shaped ring having a ring diameter of 25.7 mm (inner diameter) and a wire diameter of 3.5 mm was produced.

Comparative Example

The same operation as in Example 1 was performed, except that the fluorodisilane compound (ECC-1000) was not added. Moreover, in the same condition as the production of the sheet, an O-shaped ring having a ring diameter of 25.7 mm (inner diameter) and a wire diameter of 3.5 mm was produced.

Compounding Ratio of the Elastomer and Vulcanization Property

The compounding ratio and the property after the first vulcanization are shown in the following Table 1.

TABLE 1

| Compounding Ratio | Comparative Example | Example 1 | Example 2 | Example 3 | Example 4 |
|---|---|---|---|---|---|
| Perfluoroelastomer | 100 | 100 | 100 | 100 | 100 |
| E-18412 | 7.5 | 7.5 | 7.5 | 7.5 | 7.5 |
| MT Carbon | 15 | 15 | 15 | 15 | 15 |
| Silica | 1 | 1 | 1 | 1 | 1 |
| ECC-1000 | 0 | 0.25 | 0.5 | 0.75 | 1.0 |
| Vulcanization Property (188° C. × 15 min) | | | | | |
| MH (dNm) | 108.3 | 104.3 | 104.9 | 101.8 | 104.2 |
| ML (dNm) | 9.2 | 8.71 | 8.55 | 8.78 | 8.64 |
| Ts2 (min) | 2.87 | 2.65 | 2.79 | 2.58 | 2.93 |
| T50 (min) | 5.47 | 5.51 | 5.73 | 5.27 | 5.34 |
| T90 (min) | 9.62 | 10.9 | 10.2 | 9.79 | 9.70 |

In the above table, MH means the torque maximum value, and ML means the torque minimum value. Ts2 means the time required for 2-point rise, and T50 means the time of 50% vulcanization (midpoint of the vulcanization reaction), and T90 means the time of 90% vulcanization time (optimal vulcanization point). The cure rheology of the samples was investigated by testing uncured, compounded mixtures using the Alpha Technology ODR 2000 and tested in a similar manner as described in ASTM D2084-07.

Peel Strength Tests of Elastomer Sheet to Metal

On a piece of stainless steel (SUS) whose surface was polished by a sand paper and then degreased, each of the above-described sheet samples having a thickness of 2 mm that were cut into 10 mm×70 mm. The sheet samples were mounted and sandwiched by a jig and a pressure was applied thereto (sheet compression ratio was 20%). In the state of applying the pressure, the sample was pressure-bonded for 48 hours in a 100° C. oven. The jig was taken out of the oven, and then, in the state of applying the pressure, the temperature was cooled to room temperature, and then, the oven was opened and the sample was provided for a peeling test. In the peeling test, a tensile testing machine was used, and the peeling strength between the rubber sheet and the metal base material was measured at a rate of 50 mm/min. The measurement was performed 3 times per each of the samples, and the average value was obtained. The results are shown in the following Table 2.

Compression Set Test of O-ring

The O-rings in Example 4 and the Comparative Example were tested for compression set for 48 hours at 200° C. in a similar manner as described in ASTM D 395-03 Method B and ASTM D 1414-94. Results are reported as percentages. The results are shown in the following Table 2.

TABLE 2

|  | Comparative Example | Example 1 | Example 2 | Example 3 | Example 4 |
|---|---|---|---|---|---|
| Peeling Strength Kgf | 1.05 | 0.80 | 0.61 | 0.15 | 0.31 |
| Compression Set % (200° C. × 48 Hrs) | 8 | — | — | — | 12 |

— indicates samples were not tested.

The invention claimed is:

1. A perfluoroelastomer composition comprising (A) a perfluoroelastomer and (B) 0.2 to 1 parts by mass of a fluorosilane compound based on 100 parts by mass of the perfluoroelastomer, wherein the fluorosilane compound is a perfluoropolyether.

2. The perfluoroelastomer composition according to claim 1, wherein the fluorosilane compound is a fluorodisilane compound.

3. The perfluoroelastomer composition according to claim 1, wherein the perfluoropolyether has the following formula $$R_f^1\text{-}[\text{-}QSiY_{3-x}R^1_x]_y$$

wherein $R_f^1$ represents a monovalent or divalent polyfluoropolyether group, Q represents an organic divalent linking group, $R^1$ represents a C1 to C4 alkyl group, Y represents a hydrolysable group, x is 0 or 1 and y is 1 or 2.

4. The perfluoroelastomer composition according to claim 1, wherein the perfluoropolyether has the following formula $$((RO)_3Si\text{-}L_r\text{-})_m\text{-}R_f\text{-}(O(CF_2)_s)_n\text{-}(OCF_2)_p\text{-}(OCF_2CF(CF_3))_q\text{-}R_f\text{-}L_r\text{-}Si(OR)_3$$

wherein Rf is a perfluorinated (C1-C4) alkylene group; m and r are 0 or 1; n, p and q are integers from 0 to 50; n+p+q>1; s and t are 1 to 4; L is a linking organic group —CO—NR'—(CH$_2$)$_q$— with R'=H or C$_1$-C$_4$ alkylene; R is an alkyl group.

5. The perfluoroelastomer composition according to claim 1, wherein the perfluoropolyether has the following formula $$R_fO\text{---}(R'_fO)_n\text{---}R''_f\text{---}(R)_r\text{-}L\text{-}Si(OR)_x$$

or $$((RO)_xSi\text{-}L'\text{-}R'_r)_m\text{---}(R_f)_s\text{---}(OR'_f)_p\text{---}(OR'_f)_q\text{---}(R_f)_s\text{---}(R'_r\text{-}L\text{-}Si(RO)_x)_m$$

wherein $R'_f$ independently is at least one of the following structures: (CFCF$_3$CF$_2$), (CF$_2$CFCF$_3$), (C$_2$F$_4$), (CF$_2$CF$_3$), or (C$_4$F$_9$), $R_f$ independently is a perfluorinated (C1-C4) alkyl group; $R''_f$ is a perfluorinated (C1-C4) alkylene group; x is 2 or 3, m, s, and r independently are 0 or 1; n, p and q are integers from 0 to 50; n+p+q>1; L is a linking organic group R—S—C$_3$H$_6$, O—R'—S—C$_3$H$_6$ or CO$_2$—R'—S—C$_3$H$_6$; L' is a linking organic group C$_3$H$_6$—S—R, C$_3$H$_6$—S—R'—O or C$_3$H$_6$—S—R'—CO$_2$; R' is an alkylene group, and R is an alkyl group.

6. The perfluoroelastomer composition according to claim 5, wherein the fluorinated polyether silane is (CH$_3$O)$_3$SiC$_3$H$_6$NHCOCF$_2$(OCF$_2$)$_n$CF$_2$CONHC$_3$H$_6$Si(OCH$_3$)$_3$, C$_3$F$_7$O[CFCF$_3$CF$_2$O]$_n$CFCF$_3$CH$_2$OC$_3$H$_6$SC$_3$H$_6$Si(OCH$_3$)$_3$, C$_3$F$_7$O[CFCF$_3$CF$_2$O]$_n$CFCF$_3$CH$_2$OC$_3$H$_6$SC$_3$H$_6$Si(OC$_2$H$_5$)$_2$, C$_3$F$_7$O[CFCF$_3$CF$_2$O]$_n$CFCF$_3$CO$_2$C$_3$H$_6$SC$_3$H$_6$Si(OCH$_3$)$_3$, C$_3$F$_7$O[CFCF$_3$CF$_2$O]$_n$CFCF$_3$CO$_2$C$_3$H$_6$SC$_3$H$_6$Si(OC$_2$H$_5$)$_3$, (CH$_3$O)$_3$SiC$_3$H$_6$SC$_3$H$_6$OCH$_2$CF$_2$(OC$_2$F$_4$)$_n$(OCF$_2$)$_n$CF$_2$CH$_2$OC$_3$H$_6$SC$_3$H$_6$Si(OCH$_3$)$_3$, (C$_2$H$_5$O)$_3$SiC$_3$H$_6$SC$_3$H$_6$OCH$_2$CF$_2$(OC$_2$F$_4$)$_n$(OCF$_2$)$_n$CF$_2$CH$_2$OC$_3$H$_6$SC$_3$H$_6$Si(OC$_2$H$_5$)$_3$, (CH$_3$O)$_3$SiC$_3$H$_6$SC$_3$H$_6$OCH$_2$CFCF$_3$[OCF$_2$CF(CF$_3$)]$_n$OC$_4$F$_9$O[CFCF$_3$CF$_2$O]$_q$CFCF$_3$CH$_2$OC$_3$H$_6$SC$_3$H$_6$Si(OCH$_3$)$_3$, (C$_2$H$_5$O)$_3$SiC$_3$H$_6$SC$_3$H$_6$OCH$_2$CFCF$_3$[OCF$_2$CF(CF$_3$)]$_n$OC$_4$F$_9$O[CFCF$_3$CF$_2$O]$_q$CFCF$_3$CH$_2$OC$_3$H$_6$S C$_3$H$_6$Si(OC$_2$H$_5$)$_3$, C$_3$F$_7$O[CFCF$_3$CF$_2$O]$_n$CFCF$_3$CH$_2$CH$_2$SC$_3$H$_6$Si(OCH$_3$)$_3$, C$_3$F$_7$O[CFCF$_3$CF$_2$O]$_n$CFCF$_3$CH$_2$CH$_2$SC$_3$H$_6$Si(OC$_2$H$_5$)$_3$, C$_3$F$_7$O[CFCF$_3$CF$_2$O]$_n$CFCF$_3$CF$_2$OC$_3$H$_6$SC$_3$H$_6$Si(OCH$_3$)$_3$C$_3$F$_7$O[CF$_2$CF$_2$CF$_2$O]$_n$C$_2$F$_4$CH$_2$OC$_3$H$_6$SC$_3$H$_6$Si(OCH$_3$)$_3$, and C$_3$F$_7$O[CF$_2$CF$_2$CF$_2$O]$_n$C$_2$F$_4$CH$_2$CH$_2$SC$_3$H$_6$Si(OCH$_3$)$_3$ wherein n is an integer from 0 to 50 and n+q is up to 30.

7. A sealing material shaped from the perfluoroelastomer composition according to claim 1.

* * * * *

UNITED STATES PATENT AND TRADEMARK OFFICE
CERTIFICATE OF CORRECTION

| | | |
|---|---|---|
| PATENT NO. | : 8,013,064 B2 | Page 1 of 2 |
| APPLICATION NO. | : 12/532466 | |
| DATED | : September 6, 2011 | |
| INVENTOR(S) | : Katsuhiko Nakazato | |

It is certified that error appears in the above-identified patent and that said Letters Patent is hereby corrected as shown below:

Title Page, Item [87] Column 1
Line 1, delete "WO2007/111465" and insert in place thereof -- WO2008/130872 --.

Line 1, delete "Oct. 4, 2007" and insert in place thereof -- Oct. 30, 2008 --.

Column 3
Line 22, delete "FC$_3$," and insert in place thereof -- CF$_3$, --.

Line 49, delete "methyl -3," and insert in place thereof -- methyl-3, --.

Line 61, delete "perfluoropolyether," and insert in place thereof -- perfluoropolyether. --.

Column 4
Line 41, delete "R$_r$)" and insert in place thereof -- R'$_r$) --.

Line 42, delete "(R$_r$" and insert in place thereof -- (R'$_r$ --.

Line 46, delete "R"$_f$is" and insert inplace thereof -- R"$_f$ is --.

Line 51, delete "R" and insert in place thereof -- R' --.

Line 67, delete "H$_3$)$_3$" and insert in place thereof -- H$_3$)$_3$, --.

Column 5
Line 16 (approx.), delete "the the" and insert in place thereof -- the --.

Column 6
Lines 11-14 (approx.), delete "ECC-1000 was set to 1.0 parts by mass. Moreover, in the same condition as the production of the sheet, an O-shaped ring having a Signed and Sealed this
Tenth Day of April, 2012

David J. Kappos
*Director of the United States Patent and Trademark Office* ring diameter of 25.7 mm (inner diameter) and a wire diameter of 3.5 mm was produced." and insert the same after "of" on Column 6, Line 10 (approx.) as a continuation of same paragraph.

Column 8
Line 10, in Claim 5, delete "$R'_{r)m}$" and insert in place thereof -- $R'_r)_m$ --.

Line 10, in Claim 5, after "$(R_f)_s$" insert -- —$(OR'_f)_n$ --.

Line 41 (approx.), in Claim 6, delete "$H_3)_3$" and insert in place thereof -- $H_3)_3$, --.